United States Patent [19]
Hunter et al.

[11] Patent Number: 4,844,106
[45] Date of Patent: Jul. 4, 1989

[54] APPARATUS AND METHOD FOR CLEANING SHARDS FOR RECYCLING

[75] Inventors: James W. Hunter, 938 Pinewood Dr., Sparks, Nev. 89431; Richard N. Schneider, Reno, Nev.

[73] Assignee: James W. Hunter, Sparks, Nev.

[21] Appl. No.: 731,452

[22] Filed: May 6, 1985

[51] Int. Cl.⁴ .............................................. B08B 3/04
[52] U.S. Cl. .................................... 134/73; 134/109; 134/111; 134/131; 134/182; 210/305; 210/298; 210/526
[58] Field of Search ..................... 134/70, 72, 73, 109, 134/111, 131, 182; 175/66, 207; 99/536; 210/305, 298, 400, 526, 522, 525, 528, 537, 531.2

[56] References Cited

U.S. PATENT DOCUMENTS

| | | | |
|---|---|---|---|
| 952,734 | 3/1910 | Haller | 134/74 |
| 1,104,571 | 7/1914 | Steven | 134/73 |
| 1,964,275 | 6/1934 | Secondo | 134/73 X |
| 2,010,497 | 8/1935 | Skinner | 134/73 X |
| 2,431,984 | 12/1947 | Bean | 209/17 |
| 2,626,051 | 1/1953 | Innes et al. | 209/157 |
| 2,635,614 | 4/1953 | Ford | 134/74 X |
| 2,746,605 | 5/1956 | Baum | 210/526 X |
| 2,828,018 | 3/1958 | Chayen | 99/536 X |
| 3,064,806 | 11/1962 | Hukki | 209/17 X |
| 3,222,221 | 12/1965 | Branson | 134/73 X |
| 3,242,933 | 3/1966 | Huff | 134/73 X |
| 3,351,112 | 11/1967 | Creed | 99/536 X |
| 3,357,555 | 12/1967 | Garland | 209/157 X |
| 3,932,280 | 1/1976 | Anderson | 210/526 X |
| 4,230,477 | 10/1980 | Sharonov | 210/526 X |
| 4,515,607 | 5/1915 | Wolde-Michael | 210/526 X |
| 4,518,496 | 5/1985 | Kanekubu | 210/526 X |

*Primary Examiner*—Frankie L. Stinson
*Attorney, Agent, or Firm*—Timothy J. Martin; J. Preston Oxenham

[57] ABSTRACT

Apparatus and a method accomplished by the apparatus is disclosed for cleaning shards, such as clay pigeon fragments, of debris and contaminant materials for recycling. The apparatus includes a reservoir containing a washing fluid and a moving conveyor partially submerged in the fluid. A screen has an outlet positioned above the submerged portion of the conveyor so that the shards may pass along the screen to the conveyor while some debris and contaminant material falls through the screen and into the reservoir away from the conveyor. The shards are washed in the fluid and are conveyed by the conveyor out of the fluid and past a bank of spray nozzles which spray the shards in a direction against the motion of the conveyor. Preferably, the screen from the bottom of a hopper and the shards are introduced by the hopper onto the conveyor under the influence of a fluid spray. A pump system circulates fluid through the various sprayers. A weir is included to trap buoyant debris. Crushing apparatus may be employed to reduce the shards to the desired particulate size for reuse.

24 Claims, 4 Drawing Sheets

4,844,106

APPARATUS AND METHOD FOR CLEANING SHARDS FOR RECYCLING

BACKGROUND OF THE INVENTION

The present invention relates to the removal of debris and unwanted contaminant material from shards so that the shards may be cleaned and prepared for use in refabricating objects. In this sense, shards genrally mean fragments of objects, such as glass, thermoset materials, ceramics, plastics and the like, although the cleaning method and apparatus described herein may be useful for other materials as well. Thus, the present invention is concerned with the recycling of these materials in industrial applications. The present invention finds particular usefulness in recycling "clay pigeons" which are commonly used in the popular shotgun sport of trap and skeet shooting. While this invention is described in reference to recycling these clay targets which are formed of a thermoset material, it should be appreciated that the scope of this disclosure may readily be adapted for use in other industrial recycling activities where materials or objects for recycling have become contaminated by debris, dirt, sand or the like.

Currently, a thermoset material is used to manufacture clay targets and comprises a mixture of resin, such as coal tar or petroleum pitch, and calcium carbonate (lime). The resin and lime are mixed in proportions to provide a desired target weight and brittleness. In the manufacturing process, the resin is melted and the lime, in powder form, is mixed with the melted resin to form a homogenous mixture that is then heated to approximately 350° F. The manufacturer casts (thermosets) the material in the desired shape by means of a mold which is removed from the clay target after the material cools. Manufacturers currently employ virgin material to produce these clay targets which results in a consumption of material resources.

The sport of trap and skeet shooting utilizes these clay targets wherein the targets are mechanically launched and contestants fire at the targets while they are in flight. Since the targets are made of a brittle material, they break into fragments or shards when hit by a pellet or upon impact with the ground should they not be struck. Substantial quantities of these shards from used targets will build up at a typical gun range, with these shards becoming mixed with a variety of debris, such as shell wadding material, shells, twigs, paper, nails and the like as well as other contaminants such as dirt and sand.

When attempts are made at recycling the clay target shards, several problems are encountered. Since the materials must be pulverized for refabrication, the presence of durable debris or contaminamts can cause substantial damage to the reprocessing equipment. Even if these materials are removed, other contaminants may degrade the strength of the new fabricated target which must be strong enough to withstand the mechanical launching process but weak and brittle enough to shatter when hit by even one shell pellet. The presence of contaminants in the recycled material can degrade the strength of the refabricated target. Thus, target manufacturers facturers rely on virgin materials, as discussed above, while large quantities of used shards remain available.

Accordingly, there is a need for an apparatus and method that can remove debris and contaminant materails so that such shards may be pulverized or crushed and reused. There is further a need for such an apparatus and invention that can economically clean shards so that the shards may be recycled in a cost-effective manner. Such a method and apparatus would be beneficial from an environmental point of view in eliminating the need for a total use of virgin material while at the same time eliminating the large build-up of shards at shooting ranges.

SUMMARY OF THE INVENTION

It is an object of the present invention to provide an apparatus and method for removing debris and unwanted contaminant materials from shards of objects in an economical manner.

It is another object of the present invettion to provide a new and useful apparatus and method for cleaning and preparing shards for recycling so that debris and contaminants which may potentially damage the fabrication machinery are eliminated from the materials.

Another object of the present invention is to provide an apparatus and method that permits the utilization of existing quanitities of shards, such as are found at shooting ranges, in the manufacture of clay targets whereby debris and contaminant materials are removed, thus allowing the refabricated targets to have essentially the same strength and brittleness characteristics as targets from virgin material.

To accomplish these objects, the present invention comprises both an apparatus and a method employed by such apparatus to remove debris and contaminant materials from shards of objects such as clay pigeons, bottles, other glass, plastic, ceramic or thermoset objects and the like. The apparatus broadly includes a reservoir which contains a fluid material, such as water. A moveable conveyor is mounted in the reservoir so that a first stage of the conveyor is submerged in the fluid and a second stage of the conveyor angles upwardly and outwardly of the fluid. A screen is mounted above the first stage of the conveyor and a deflector is interposed between the screen and the lowermost portion of the conveyor first stage. A bank of spray nozzles are positioned along the second stage of the conveyor so that a spray of fluid may be directed along the upper face of the conveyor in a direction opposite the conveyor's movement.

In utilizing this apparatus, shards of material are dropped onto the screen, which is angled with respect to the fluid surface in the reservoir, and the shards slide along the screen to be discharged onto the conveyor first stage below the surface of the fluid. Contaminants, such as sand and dirt, fall through the screen and are deflected away from the conveyor by the deflector plate. When the screened shards pass into the fluid and land on the first conveyor stage, buoyant materials, such as paper, wadding, twigs, and the like, will become dislodged from the screened shards and float to the water's surface. As the screened shards are mechanically conveyed out of the fluid toward and along the second stage of the conveyer, the bank of spray nozzles provide a backwash that further removes unwanted debris from the shards and which nozzles also prevent the removed buoyant materials from adhering to the conveyor by virtue of the surface tension of the fluid. After passing the bank of spray nozzles, a magnet may be provided to remove magnetic materials, such as nails, so that the shards may be collected and placed in a pulverizing apparatus, such as a roller crusher or hammer mill.

Preferably, the introduction of the shards onto the screen is accompanied by a spraying of those shards with pressurized water provided by a pumping system that circulates water through the reservoir. A weir is provided in the reservoir and the water circulation causes a backflow of reservoir water from the conveyor and over the weir so that buoyant debris passes over the weir and becomes trapped in a secondary reservoir. A removable screen is contained in this second reservoir so that, when the screen is removed, the buoyant materials may be withdrawn therefrom.

According to the present invention, the preferred method broadly includes the steps of screening the shards by a screen having a mesh size substantially smaller than the average size of the shards where some of the debris and contaminant materials may pass through the screen. The screened shards are introduced onto a moving conveyor surface which moves in a first direction and which conveyer has a first conveyor stage submerged in a fluid contained in a reservoir and a second conveyor stage sloping upwardly out of the fluid in the reservoir. The screened shards are washed by the fluid during the first conveyor stage so that some of the debris and contaminant materials are removed after which the washed shards are conveyed from the first conveyor stage through the second conveyor stage to a conveyor discharge point. The washed shards are conveyed in a first direction against a counter spray of fluid to further remove debris and contaminant materials therefrom, and the processed shards are then crushed to a desired particulate size for use in the refabrication. This broad process may also include the process of magnetically removing magnetic particles from the washed shards and the step of backwashing the fluid in the reservoir against the direction of motion of the conveyor.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention relates to an apparatus and method useful in removing debris in unwanted contaminant materials from shards of objects such as clay pigeons, bottles, glass, ceramic, plastic, thermoset objects and the like, in order to clean and prepare such shards for recycling. Thus "shards" refers to fragments of these objects although the cleaning of an intact object, such as a bottle, is comtemplated herein. While the preferred embodiment of the present invention is described in respect to the recycling of the thermoset material commonly used in the manufacture of clay targets, also known as clay pigeons, the technique described herein may be employed in the cleaning of various types of fragmented materials, especially where the use of such fragmented materials involves crushing or pulverizing the material.

Figure 1:
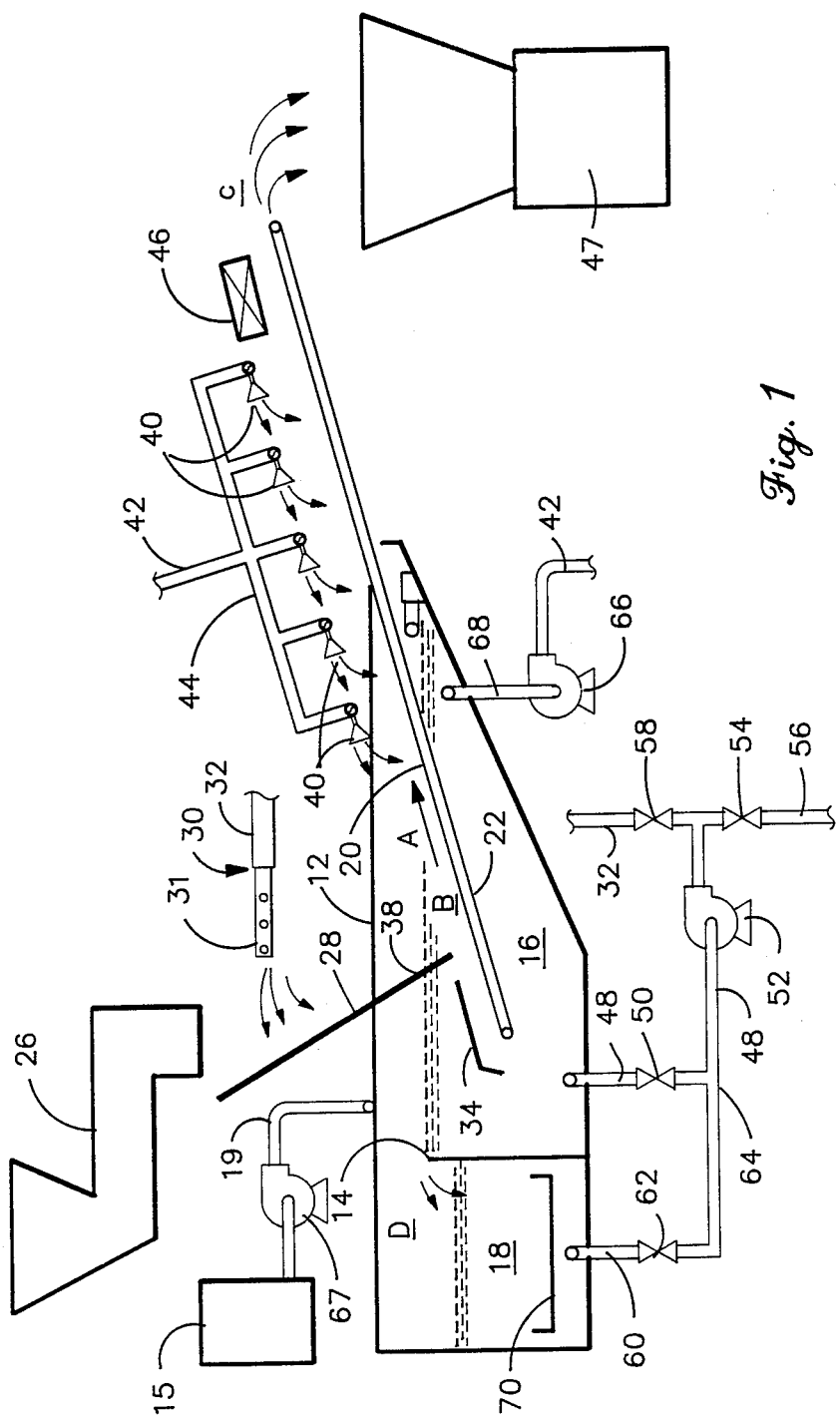
FIG. 1 is a diagram of the apparatus according to the preferred embodiment of the present invention which apparatus is used in performing the preferred method of the present invention.

The broad aspects of the present invention are shown in FIG. 1 wherein a diagram cleaning apparatus 10 includes a large reservoir 12 that is separated by a weir 14 into a first or primary reservoir section 16 and a secondary reservoir section 18. Representative fluid levels are shown in phantom in reservoir sections 16 and 18 with the fluid level in section 16 being slightly deeper than the fluid level in section 18 with this disparity in depths being discussed below. An elongated conveyor 20 is positioned in reservoir 12 so that it slopes upwardly and out of reservoir 12. Conveyer 20 is divided into a first conveyor section 22 which is submerged in the fluid contained in primary reservoir 16; a second conveyor section 24 protrudes from primary reservoir 16 at an acute angle to the fluid surface. Conveyor 20 is moveably driven from the left to the right as is shown in FIG. 1 and as indicated by arrow A in that figure. Fragments or shards are discharged from a dispenser 26 onto a screen 28 with dispenser 26 being in a suitable mechanical transport mechanism that allows the shards to be placed on screen 28. A first fluid source 30 operates to spray fluid from conduit 32 onto screen 28 so that, as the shards move down screen 28, fluid jets help force contaminant materials and debris through screen 28 which has a mesh size substantially smaller than the average size of the shards but large enough to allow some of the contaminant material to pass through screen 28. A deflector plate 34 is positioned between screen 28 and end 36 of first conveyor section 22 so that the contaminant materials which pass through screen 28 impact deflector plate 34 which shields end portion 36 of conveyor 20. The screened shards leave screen 28 at an end 38 thereof which is submerged in the fluid in reservoir section 16, thus being introduced onto conveyor 20 at B.

As the screened shards are conveyed along conveyor 20, they are washed by the fluid in primary reservoir 16 along first conveyor section 22. The shards then move on to second conveyor section 24, which is above the fluid surface level, and proceed upwardly along conveyor 20 to conveyor discharge point C. During this movement along second conveyor section 24, the shards are washed by a plurality of fluid jets 40 which are connected to a fluid conduit 42 by means of manifold 44. The shards then pass underneath magnet 46 which operates to remove magnetic particles that may still remain mixed up with the shards. When the shards are discharged at point C, they may be placed in a crusher or pulverizer 48 underneath the end of conveyor 20. Alternatively, the shards may be collected and transported in a pulverizer 48 that is located away from cleaning apparatus 10.

A fluid pumping system is provided to circulate fluid in reservoir 12. The fluid pumping system includes a water source 15 connected through controller 17, which may be a valve or pump, to an inlet pipe 19 to provide initial fluid and replacement fluid for reservoir 16. A conduit 48 forms an outlet at a lower portion of primary reservoir 16 and includes a shut-off valve 50 which may allow pump 52 to pump fluid from reservoir section 16 where it may be discharged past valve 54 in drain pipe 56 or circulated past valve 58 to conduit 32 that is in fluid communication with nozzle 30, as described above. An outlet conduit 60 is provided at a lower portion of secondary reservoir 18 with outlet conduit 60 being controlled by valve 62 and connected to conduit 48 at T connection 64. Thus, fluid may be pumped by pump 52 from reservoir sections 16 and 18 either separately, or valves 50 and 62 may be adjusted so that fluid may simultaneously be pumped in relative proportions, from reservoir sections 16 and 18. A second pump 66 is provided to remove fluid from an upper portion of reservoir section 16 by outlet conduit 68 with pump 66 then forcing fluid through conduit 42 in order to provide fluid for fluid jets 40.

It should now be appreciated that the relative levels of fluid in reservoir sections 16 and 18 may be controlled by adjusting valves 50 and 62, with it being desirable that the fluid level in secondary reservoir 18 be kept lower than the fluid level in reservoir section 16. Thus, since fluid is introduced into reservoir section 16 by means of nozzle 30 and 40, the fluid spills over from reservoir 16 over weir 14 and into secondary reservoir section 18 at D. This spillage provides a backwash so that any debris which is buoyant in the fluid will drift away from screen 28 and conduit 20 to be trapped in secondary reservoir 18. This debris may then be removed from reservoir section 18 by removing the screen 70 located at a lower portion therein which strains the fluid and traps the debris and contaminant materials in reservoir section 18. A float 72 is provided at the upper portion of reservoir section 16 to monitor the fluid level therein with the position of float 72 being used to automatically adjust the operation of controller 17 as well as pumps 52 and 66.

Figure 2:
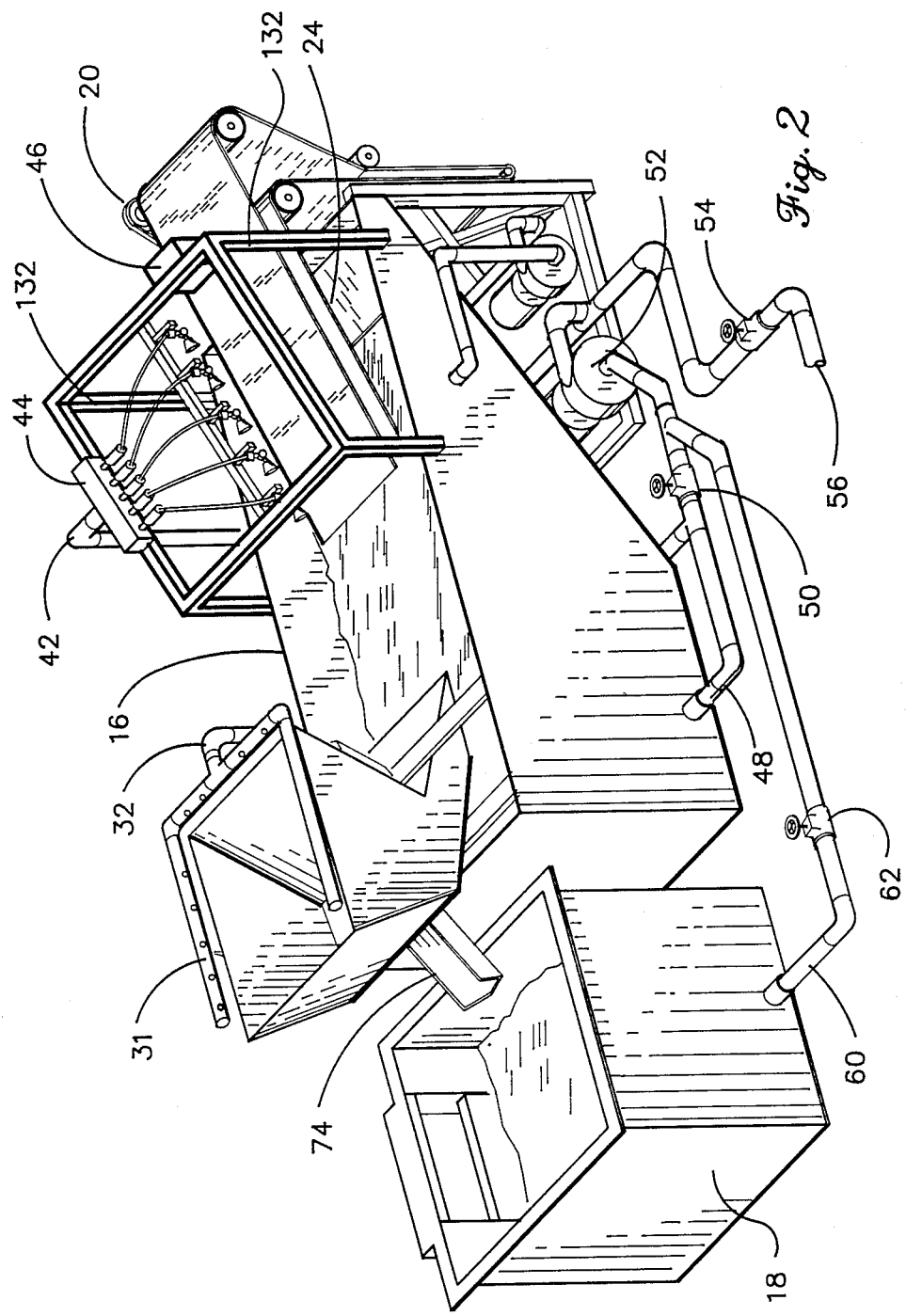
FIG. 2 is a perspective view of the apparatus according to the preferred embodiment of the present invention.
Figure 3:
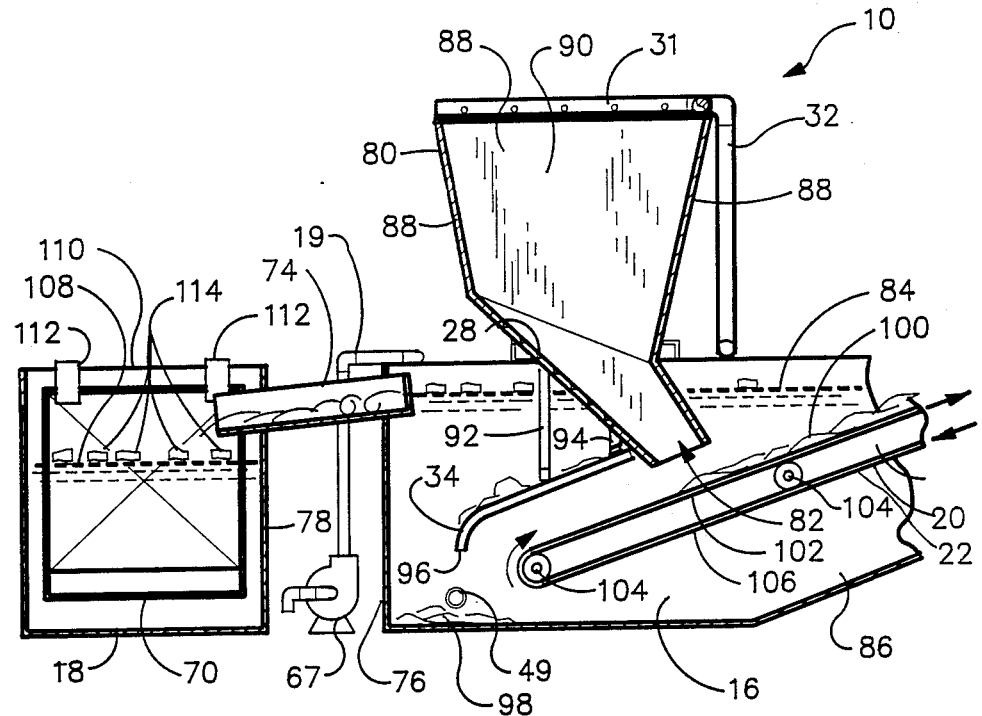
FIG. 3 is a side view in cross-section of the first cnveyor stage of the apparatus shown in FIG. 2.

The structure and operation of cleaning apparatus 10 as it is directed to first conveyor section 22 is best shown in greater detail in FIGS. 2 and 3. Here, it should be appreciated that reservoir 12 is constructed as two discreet reservoirs, those being primary reservoir 16 and secondary reservoir 18 which are connected by gutter 74 so that gutter 74, along with end wall 76 of reservoir 16 and end wall 78 of reservoir 18 define the weir 14 shown in FIG. 1. In FIG. 3, screen 28 is formed as an inclined bottom wall of hopper 80, with screen 28 sloping downwardly from a location above reservoir 16 towards hopper outlet 82 which is submerged below surface 84 of fluid 86. Hopper 80 includes side walls 88 which diverge upwardly and outwardly and form in open mouth 90 through which shards containing debris and contaminant materials may be dumped onto screen 28. As noted above, jets 30 are formed by a manifold 31 around a portion of the perimeter of mouth 90 and manifold 31 discharges fluid onto the shards as they are placed in hopper 80. Manifold 31 is connected to conduit 32 which receives fluid from pump 50.

As the shards descend along inclined screen 28, particulate debris and contaminant materials pass through screen 28 and, if such materials have a greater specific gravity than fluid 86, these materials descend downwardly through fluid 86 where they impact deflector plate 34. Deflector plate 34 is mounted to hopper 80 by means of support mounts 92 and 94 and deflector plate 34 is configured in a plane generally parallel to conveyor 20. Deflector plate terminates in a downwardly turned lip 96 at an end opposite hopper 80 so that the debris and materials that impact deflector plate may be deflected away from conveyor 20 so that they collect in a pile, such as contaminant pile 98, in a corner of reservoir 16.

The screened shards, such as shards 100, are introduced onto the moving surface of conveyor 20 on an upper conveyor portion 102 of first conveyor section 22. Conveyer 20 is constructed as is known in the art and is generally in the form of a continuous loop or web that is supported on a plurality of rollers 104 with the upper loop portion defining a conveying surface and the lower loop portion being a web return. It should be appreciated that the conveying surface (upper section 102) of the conveyor moves from left to right, as is shown in FIG. 3, while the lower return section 106 moves from the right to the left in that figure.

As shards 100 advance along conveyor 20, fluid 86, which is preferably water, washes the shards to remove the majority of debris and contaminant material therefrom. Any buoyant, that is, any debris which has a specific gravity less than water, floats to surface 84 and, since the fluid level 108 in secondary reservoir 18 is lower than surface 84, these buoyant materials pass through gutter 74 and into secondary reservoir section 18 to become trapped therein. Draining screen 70 is configured for telescoping insertion into secondary reservoir 18 and is retained along edge 110 thereof by a plurality of brackets 112. Straining screen 70 may be removed from reservoir 18 to allow buoyant particles 114 to be removed from cleaning apparatus 10.

Figure 4:
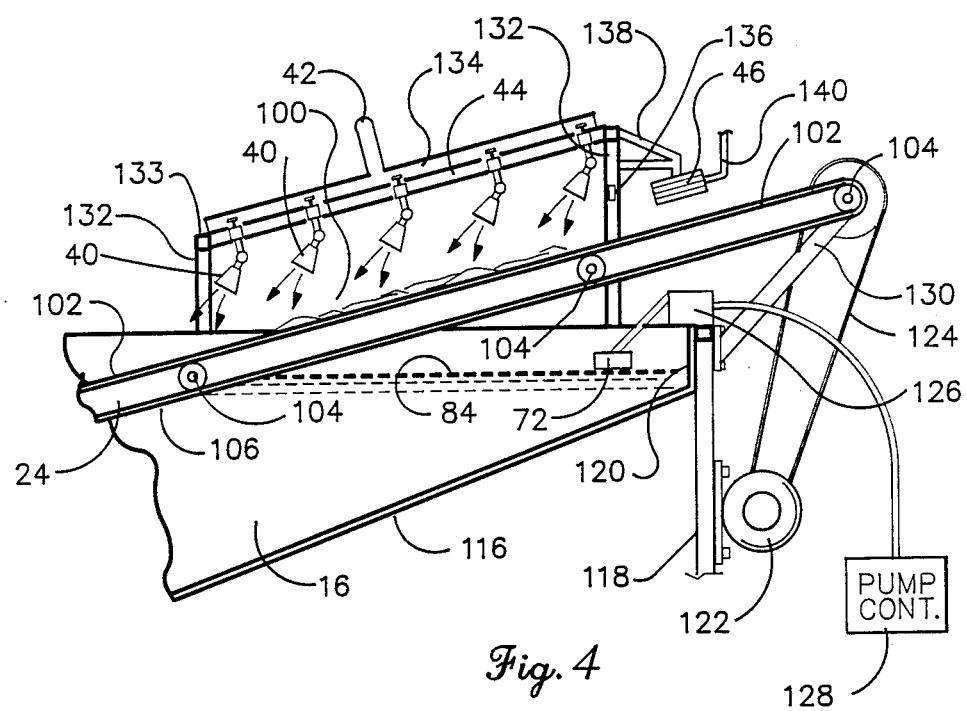
FIG. 4 is a side view in cross-section of the second conveyor stage of the apparatus shown in FIG. 2.

FIG. 4 is directed to second conveyor section 24. Here, primary reservoir 16 includes an inclined end wall 116 that is generally parallel with conveyor 20. An upright support 118 supports end 120 of primary reservoir 16 with support 118 mounting a motor 122 that operates drive belt 124 which provides the motive source for conveyor 20. As noted above, float 72 is connected to a monitor 126 so that the fluid level 84 in reservoir 16 may be observed, and monitor 126 is connected to pump control unit 128 which processes data from monitor 26 to regulate controller pump 17, 52 and pump 66, as is known in the art. A brace 130 supports conveyor 20 in spaced relation to reservoir 16.

As shards 100 move upwardly along second conveyor section 24, as noted above, the shards pass under a plurality of fluid jets 40 which continuously spray the shards with water to further rinse and wash the shards causing any remaining debris and contaminant material from shards 100. Nozzles 40 have spray axes that are canted at an angle of between 30° and 60° with respect to conveyor web 102 so that the water spray provides a counterflow against the movement of shards 100 along conveyor 20. Fluid jets 40 are connected to manifold 44 which receives fluid from conduit 42. Manifold 44 and nozzle and jets 40 are rigidly attached to reservoir 16 by means of a framework including upright supports 132 and cross members 134. A scraper bar 136 extends between a pair of supports 132 so that shards 100 are flattened out so that they may pass under magnet 46 which is mounted to framework 133 by means of bracket 138. An electrical lead 140 provides power to magnet 46, which is an electromagnet, with lead 140 being connected to any convenient power source. Magnet 46 is operated to remove magnetic particles, such as nails and the like, from shards 100 so that shards 100 may be introduced into crushing mechanism 47 which is used to pulverize shards 100 into a final, useable product.

Figure 5:
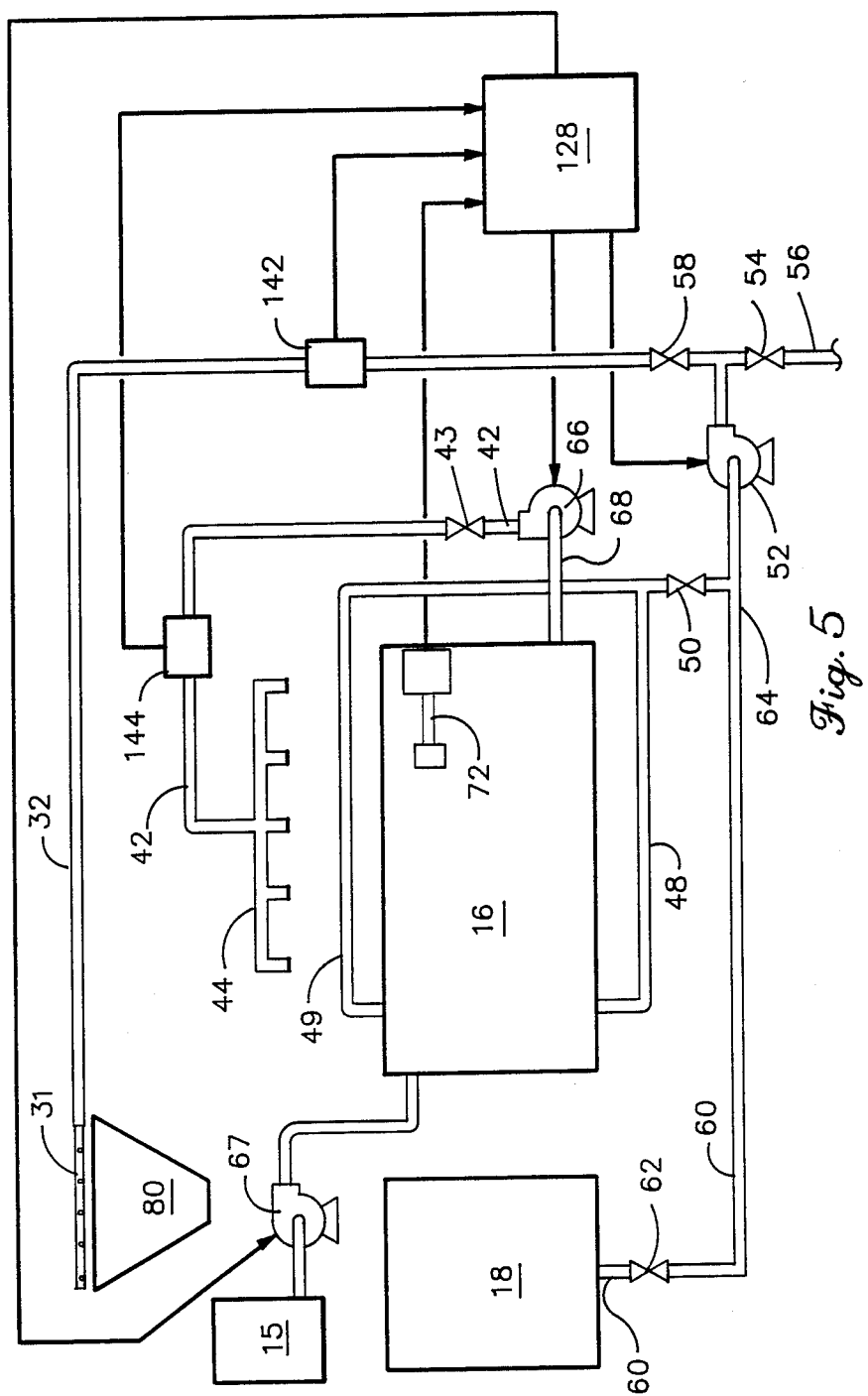
FIG. 5 is a diagram of the pumping system according to the preferred embodiment of the present invention.

FIG. 5 diagrammetically shows the fluid circuit used for cleaning apparatus 10. As is shown in FIG. 5, primary reservoir 16 has a pair of outlet conduits 48 and 49 which are in fluid communication with one another adjacent valve 50 and allow water to be removed from reservoir 16. Reservoir 18 includes an outlet conduit 60 which is controlled by valve 62, and the outlet conduits 48 and 49 are in fluid communication with outlet conduit 60 at T connection 64. Thus, pump 52 will be operated to pump fluid from either reservoir 16, reservoir 18 or both, depending upon the state of valves 50 and 62. Pump 52 either pumps fluid to discharge outlet 56 or through the circulating valve 58 so that it provides a fluid source for manifold 31. In typical operation, fluid is pumped from reservoir 18 through conduit 60 and 32 to manifold 31 with fluid being pumped out of reservoir 16 through conduit 48 for draining purposes only. Flow monitor 142 monitors flow through conduit 32 with this data being received by pump control 128 for use in automatic operation of pumps 52 and 66. Additional water is removed from reservoir 16 by outlet conduit 68 and pump 66. This water is circulated through conduit 42 and a valve 43 so that it is introduced into manifold 44. Flow monitor 144 monitors the flow of fluid through conduit 42 with data from monitor 144 also being presented to pump control 128. Pump control 128 also receives fluid level position information from float 72 with this data then being used to control pumps 52 and 66. Float 72 also signals pump control 128 when the fluid surface in reservoir 18 drops below a desired level so that control 128 operates controller 17 to inlet additional fluid into reservoir 16.

Based on the foregoing, it should be appreciated that the method according to the preferred embodiment of the present invention is directed towards a method of removing debris and unwanted contaminant materials from shards of objects whereby such shards are cleaned and prepared for recycling. The preferred method comprises the broad steps of screening the shards whereby some of the debris and contaminant materials may be removed; introducing the screened shards onto a moving conveyor surface moving in a first direction at a location submerged in a fluid contained in a reservoir with the conveying surface being partially submerged in the fluid; mechanically conveying the washed shards on the conveying surface along a first conveyor stage through the fluid; then along a second conveyor stage to a conveyor discharge point; and crushing the washed shards to a desired particulate size for use in refabrication of ceramic objects.

The broad method according to the preferred embodiment may also include the steps of spraying the shards with a counterspray of fluid while they are conveyed along with the second conveyor stage and spraying the shards with fluid while they are being screened. The step of moving the fluid in the reservoir in a direction opposite the direction that the shards are conveyed by the conveyor so that buoyant contaminant materials and debris are floated out of the shards and are moved away from the conveyor may also be included. This method may further include the step of passing the shards in close proximity to a magnet prior to crushing the shards so that magnetic debris and magnetic contaminant materials are removed from the shards.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. Apparatus adapted to clean shards, such as fragments of glass, thermoset materials, ceramics, plastics and the like, in order to remove debris and contaminant materials therefrom, comprising:
   a reservoir containing a washing fluid such that the fluid has a selected depth and a fluid surface in said reservoir;
   a conveyor having a first conveyor portion submerged in the fluid in said reservoir and a second conveyor portion extending out of said fluid at an angle to said fluid surface;
   mesh screening means positioned above said conveyor and having a discharge outlet above said first conveyor portion for screening debris and contaminant material from said shards, said screen means having open regions sized for retaining said shards thereon and discharging said shards at said discharge outlet onto said first conveyor portion while allowing debris and contaminant material having a size small than the open regions to fall therethrough;
   a deflector positioned beneath the screening means whereby debris and contaminant materials which fall through the open regions in said screen means are deflected away form the conveyor;
   drive means for moving said conveyor whereby the shards on said first conveyor portion are conveyed through and out of said fluid to the second conveyor portion toward a conveyor discharge; and
   first spray means for spraying fluid on the shards as they move along the second conveyor portion.

2. Apparatus according to claim 1 including second spray means for spraying the shards along said screening means.

3. Apparatus according to claim 2 including pump means for circulating the fluid whereby fluid is drawn from said reservoir and discharged through said first and second spray means, the respective sprays from said first and second spray means being returned to said reservoir.

4. Apparatus according to claim 3 including float means in said reservoir connected to pump control means, said float means and pump control means for monitoring and regulating the depth of the fluid in the reservoir.

5. Apparatus according to claim 1 including a hopper having a hopper outlet submerged in the fluid above said first conveyor portion for outletting shards from said hopper onto said conveyor, said screening means defined by a screen element located at a lower portion of said hopper, said discharge outlet defined by said hopper outlet.

6. Apparatus according to claim 5 including a deflector suspended from said hopper below said screen element and operative to deflect debris and contaminant material away from the conveyor and into the reservoir.

7. Apparatus according to claim 6 including second spray means for spraying the shards in said hopper as they move along the screen element.

8. Apparatus according to claim 1 including a weir structure separating said reservoir into first and second reservoir sections, said first conveyor portion being located in said first reservoir section, said weir being sized to permit fluid to flow from said first reservoir section over said weir and into said second reservoir section whereby debris and contaminant material that are buoyant in the fluid may be removed from said first reservoir section.

9. Apparatus according to claim 8 including a straining screen in said second reservoir section operative to trap debris and contaminant material after it has passed into the second reservoir section.

10. Apparatus according to claim 8 including second spray means for spraying the shards along said screening means and including first pump means for pumping fluid from said second reservoir section to said second spray means.

11. Apparatus according to claim 1 wherein said first spray means includes a pair of nozzles adapted to spray fluid along axes oriented at angles to said conveyor wherein said angles are between 30° and 60°, inclusive.

12. Apparatus according to claim 1 including magnet means positioned in spaced relation to said second conveyor portion for removing magnetic debris from said shards.

13. Apparatus adapted to claim shards, such as fragments of glass, thermoset materials, ceramics, plastics and the like, in order to remove debris and contaminant materials therefrom, comprising:
a reservoir containing a washing fluid such that the fluid has a selected depth and a fluid surface in said reservoir;
a conveyor having a first conveyor portion submerged in the fluid in said reservoir and a second conveyor portion extending out of said fluid at an angle to said fluid surface;
screen means positioned above said conveyor and having a discharge outlet above said first conveyor portion for screening debris and contaminant material from said shards, said screen means having open regions sized for retaining said shards thereon and discharging said shards at said discharge outlet onto said first conveyor portion while allowing debris and contaminant material having a size smaller than the open region to fall therethrough;
drive means for moving said conveyor whereby the shards on said first conveyor portion are conveyed through and out of said fluid to the second conveyor portion toward a conveyor discharge;
first spray means for spraying fluid on the shards as they move along the second conveyor portion; and
second spray means for spraying the shards along said screen means above the fluid surface.

14. Apparatus according to claim 13, wherein said reservoir has a bottom wall, surrounding side walls and an open top and adapted to contain the fluid at the selected depth with respect to said bottom wall, said reservoir being divided by a weir into first and second reservoir sections.

15. Apparatus according to claim 14 wherein said screen means includes a screen element oriented at an acute angle to the fluid surface whereby the shards will slide therealong toward said screen outlet under the force of gravity, the fluid spray from said second spray means entering the first reservoir section after if passes through the screen and the screen outlet.

16. Apparatus according to claim 15 including pump means for circulating fluid from said reservoir to said first and second spray means.

17. Apparatus according to claim 16 including a hopper for receiving shards to be cleaned, said screen forming a portion of a bottom wall for said hopper, said second a portion of the upper perimeter of said hopper, said hopper tapering inwardly and downwardly to define said screen outlet at a lower portion of said hopper.

18. Apparatus according to claim 17 including float means and pump control means for monitoring the depth of fluid in the first reservoir section and controlling said pump menas to maintain the fluid at a depth such that the screen outlet is submerged in fluid and to prevent fluid in said first reservoir section from exceeding a selected maximum depth.

19. Apparatus according to claim 14, including magnet means in spaced relation to said conveying surface at said second conveyor portion for magnetically removing magnetic debris and contaminant materials from the shards thereon.

20. Apparatus according to claim 14 wherein said weir and said conveyor are oriented with respect to one another such that the flow of fluid over said weir is in a direction away from the conveying surface generally opposite the direction of movement thereof.

21. The apparatus according to claim 14 including crushing means for receivinig shards at said conveyor discharge outlet for crushing the shards to a desired particle size.

22. The apparatus of claim 21 wherien said particle size is predominantly between 0.035 and 0.050 inches.

23. The apparatus of claim 13 wherein the fluid spray from the first spray means is directed generally opposite the direction of movement of the conveying surface.

24. The apparatus of claim 23 wherein first spray means includes a plurality of nozzles having spray axes oriented at an acute angle to said conveying surface.

* * * * *